Figure 1:
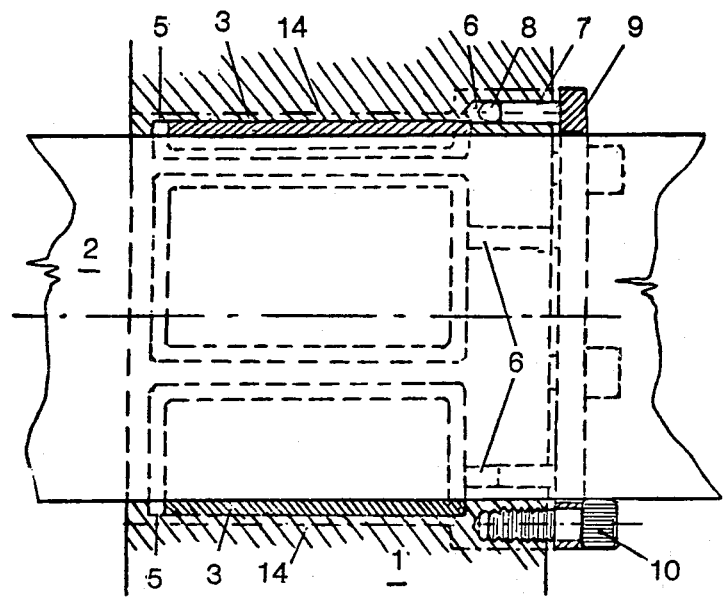

United States Patent [19]

Åsberg

[11] 4,362,411
[45] Dec. 7, 1982

[54] DEVICE FOR PROVING A FRICTION JOINT

[75] Inventor: Sture L. Åsberg, Partille, Sweden

[73] Assignee: SKF Nova AB, Gothenburg, Sweden

[21] Appl. No.: 86,415

[22] Filed: Oct. 19, 1979

[30] Foreign Application Priority Data

Jan. 10, 1979 [SE] Sweden ............................. 7900207

[51] Int. Cl.³ ............................................. F16B 00/00
[52] U.S. Cl. ....................................... 403/5; 403/15;
403/31; 29/116 AD; 188/367
[58] Field of Search ................... 403/5, 15, 31, 372;
29/113 AD, 116 AD; 192/85 AT, 86 B;
285/96, 97; 188/367

[56] References Cited

U.S. PATENT DOCUMENTS

| | | | |
|---|---|---|---|
| 2,093,281 | 9/1937 | Kreuser | 192/88 B |
| 2,249,405 | 7/1941 | Thompson | 188/367 |
| 3,023,995 | 3/1962 | Hopkins | 192/88 B |
| 3,362,733 | 1/1968 | Klara | 192/88 B |
| 3,434,303 | 3/1969 | Leyer | 403/370 X |
| 3,582,112 | 6/1971 | Pico | 285/96 |
| 3,861,815 | 1/1975 | Landaeus | 403/370 |
| 4,089,094 | 5/1978 | Kaira | 29/116 AD |
| 4,105,343 | 8/1978 | Riegler et al. | 403/15 |
| 4,183,688 | 1/1980 | Persson | 403/15 |

Primary Examiner—Wayne L. Shedd
Attorney, Agent, or Firm—Eugene E. Renz, Jr.

[57] ABSTRACT

The invention relates to a device for providing a friction joint by pressing a number of first elements against a second element by means of a pressure medium acting on said first elements. In order to obtain an improved ability of transmitting a torque and an improved stability regarding radial load, said first elements are so arranged that they encircle or are encircled by said second element and are acted upon by a number of mutually independent portions of the pressure medium, each portion acting on its own element.

9 Claims, 8 Drawing Figures

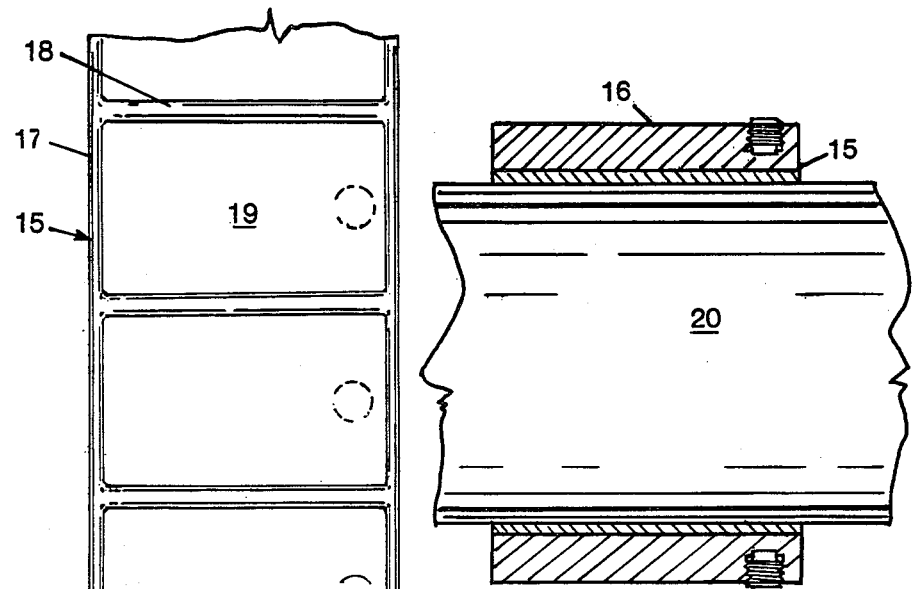
FIG. 6
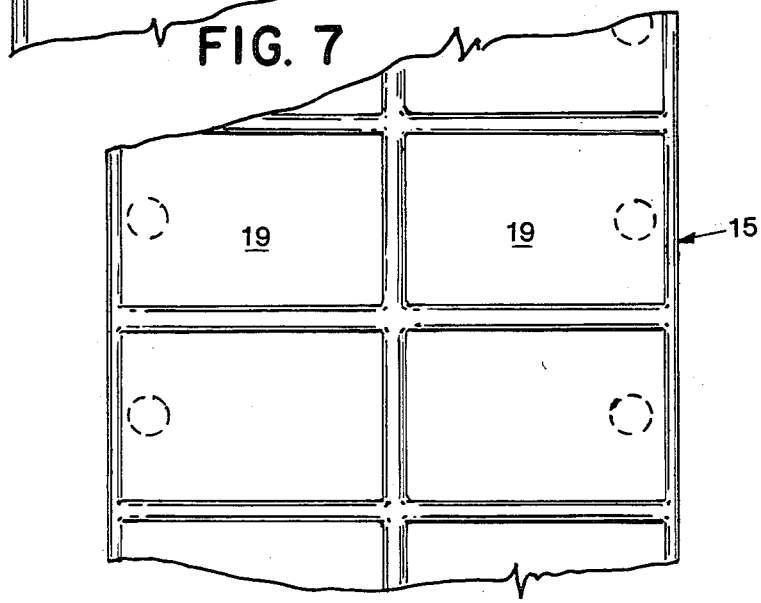
FIG. 7
FIG. 8

DEVICE FOR PROVING A FRICTION JOINT

The invention relates to a device of the kind defined in the introduction of the accompanying claim 1.

A plurality of different embodiments of such devices are previously known.

Usually they consist of in principle an outer and an inner sleeve and an intermediate annular space into which a pressure medium can be fed for elastically deforming the outer and/or the inner sleeve into contact with an element surrounding and/or an element surrounded by the device. This principle of construction entails that the ability of the device to transmit torque and its stability regarding radial load depend on how the sleeves are joined. Usually they are welded together at each end, so that a closed annular space is formed between the welding seams, and the space is filled with a pressure medium when the device is operated. Torque and radial load are thus transmitted and taken up by two welding seams, which are also stressed by the deformation of the sleeve or sleeves, which can be hazardous.

The object of the present invention is to provide a device of the above mentioned kind, which has an improved ability of transmitting torque and an improved stability regarding radial load.

This is obtained according to the invention by giving the device the characterizing features defined in the accompanying claim.

A device according to the invention can easily be produced as a self-contained unit which is easy to handle.

Figure 2:
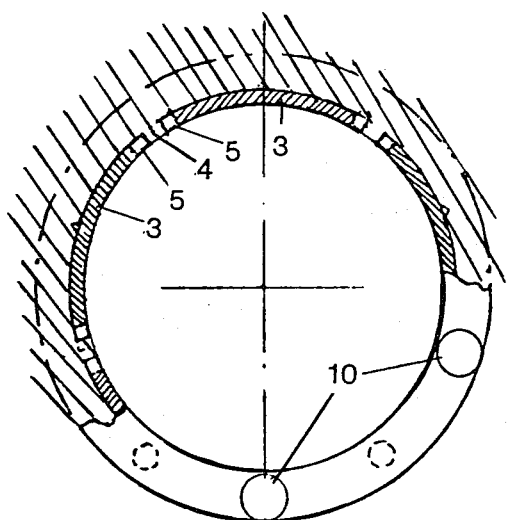

The invention will now be closer described with reference to the accompanying drawing, in which FIG. 1 shows a lateral section and FIG. 2 shows an end view with a partial cross section of a device according to an embodiment of the invention, and FIGS. 3-8 show details of devices according to different embodiments of the invention.

FIG. 1 shows portions of a member 1, which is intended for connection to an element 2, for example a shaft. The member 1 has a bore in which the element 2 is inserted. A number of pockets are provided in the bore wall around the bore circumference. An element 3 is provided in each pocket. The pockets are separated circumferentially by radial walls 4. Each element 3, which is suitably rigid, is encircled by a member 5 of elastic material, which contacts both the element 3 and the walls of the pocket. The member 5 suitably consists of rubber which can be vulcanized to the element 3 and to the walls of the pocket. Each element 3 is thus movable in the respective pocket. It is kept in position by the member 5 also when the element 2 is not inserted in the bore of the member 1. The device thus constitutes a self-contained and handy unit.

A pressure medium can be introduced between the bottom of each pocket and the respective element 3. The pressure medium intended for the respective pocket is suitably contained in a cylinder 6 communicating with the respective pocket. A piston 7 is displaceable in the cylinder for pressing the pressure medium into the pocket. The piston 7 is provided with a seal 8 for preventing leakage of pressure medium. Also the members 5 have a sealing function. The pistons 7 may be operated jointly by being mounted on a ring 9, which can be displaced axially by means of screws 10 provided in threaded bores in the member 9.

By tightening of the screws 10 the pistons 7 are pressing a pressure medium into the pockets, whereby the elements 3 are displaced radially inwards to contact with the element 2, whereby a friction joint is obtained which keeps the member 1 and the element 2 together. The joint can transmit thrust loads and radial loads as well as torques. Thrust loads and forces caused by torque are taken up by the members 5 and the walls of the pockets. The friction joint is operating as long as the screws 10 are tightened and is released when the screws 10 are released and the pressure ceases in the area between the bottom of the pockets and the elements 3.

Due to the fact that the pressure medium is divided into a number of independent volume portions, the stress on the pressure establishing members, such as the piston 7, is diminished, as volume variations due to for instance temperature variations are comparatively small.

Figure 3:
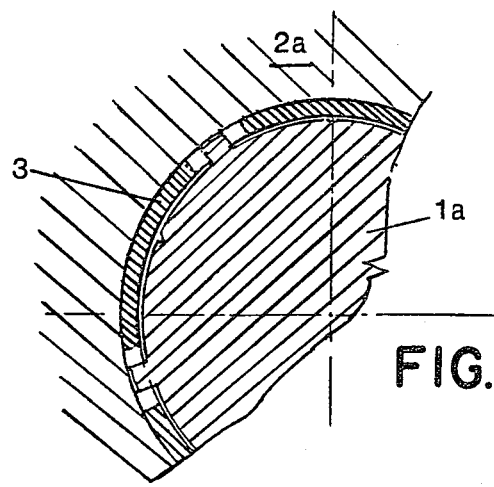
Figure 4:
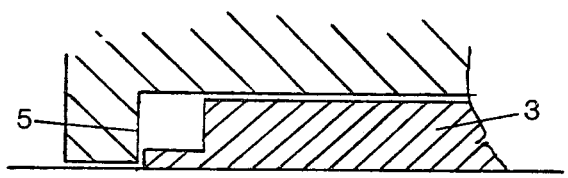
Figure 5:
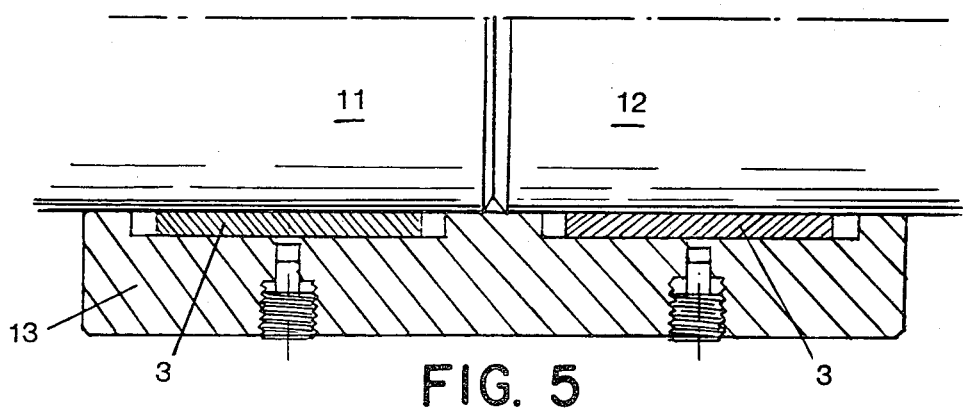

Also other embodiments of the invention than the one described above are possible. For example, the pressure medium supply may be provided in a different way, such as from an independent pressure source and via one-way valves. The pressure medium in each pocket is also in this embodiment independent. Piston and cylinder members for providing a desired pressure can be arranged in a different manner than what is shown at 6, 7, 8, 9 and 10. They may for example be arranged radially to the pockets, whereby the pistons may be operated by a screw device for each piston. The elements 3 may be arranged in pockets open radially outwards in a member 1a surrounding another element 2a, and be pressed outwardly into contact with said other element by a pressure medium, as shown in FIG. 3 in a section of a portion of a device according to an embodiment of the invention. The members 5 can be arranged in recesses around the rims of the elements 3, as shown in FIG. 4 in a longitudinal section of a portion of an element 3 and surrounding parts. Thereby forces are transmitted mainly via the elements 3 and the walls of the pockets, and not via the members 5. FIG. 5 shows in a longitudinal section how the invention can be used in a device for connecting two shafts 11 and 12. A sleeve 13 can be pushed over the ends of the shafts. The sleeve is provided with a number of pockets surrounding the end portions of the respective shafts, each pocket containing a pressure medium actuated element 3. The elements 3 can be displaced into contact with the end portions of the respective shafts, so that a friction joint is obtained. The pockets for the elements 3 may be arranged in a separate sleeve, as shown by dashed lines 14 in FIG. 1. The sleeve may be provided in a seat in the member 1, and if the walls of the sleeve are comparatively thin, the sleeve is secured in the seat by the deformation to which it is subjected when pressure medium is supplied to the pockets. The members 5 may be attached to the bottom of the pockets as an alternative or a complement to being attached to the side walls of the pockets.

In FIGS. 6 and 7 is shown how a device according to the invention can be manufactured by a sleeve 15 in a bore in a surrounding member 16. The sleeve 15 is of a resilient material and is joined to the member 16 by e.g. seam welding, the seams being arranged as shown in FIG. 7 which is a view extended in a plane of the bore wall of the sleeve 15. In the closed areas between the welding seams a pressure medium can be introduced between the sleeve and the surrounding member, so that the non-welded sleeve portions 19 between the welding seams are deformed into contact with an element inserted in the sleeve, e.g. a shaft 20 (FIG. 6). FIG. 8 shows a detail of another embodiment of the invention in a view extended in the plane of a bore wall of a sleeve. The sleeve is manufactured in analogy with the sleeve according to FIG. 7 and is provided in a bore in a surrounding element such as in FIG. 6. It is especially suitable for joining two shafts in conformity with the device shown in FIG. 5. The sleeve may also be connected to a surrounding member, whereby a device working in principle as shown in FIG. 3 is obtained. In order to improve the force transmitting ability of the joint, the friction surfaces of the elements 3, 19 may be treated so that the coefficient of friction increases. They may for example be blasted or provided with a coating of a material giving a high co-efficient of friction. As an alternative or a complement the surface of the co-operating element 2, 2a, 11, 12, 20 may be treated accordingly.

I claim:

1. Means providing a friction joint between a pair of members having confronting surfaces comprising a plurality of spaced pockets in the confronting surface of one of said members arranged in an annular pattern, an element mounted in each of said pockets, means for independently pressurizing by a fluid pressure medium each of said pockets to thereby actuate the said elements into pressure applying relation with the surface of the other member which they confront and means for selectively relieving independently the pressure in each pocket, said pockets defined by wall portions including radial walls separating the pockets circumferentially disposed closely adjacent the confronting surface of said other member whereby forces are transmitted via said elements and said walls defining said pockets, said elements bring rigid members and seal means made of a resilient elastic material surrounding the periphery of each element and contacting said elements and the walls of said pocket.

2. A friction joint as claimed in claim 1 including means for simultaneously regulating the pressure in all of said pockets.

3. A friction joint as claimed in claim 2 wherein said means for regulating the pressure in the pockets includes a cylinder connected with each of said pockets, a piston displaceably mounted in each of the said cylinders mounted on a common ring, said ring displaceable to effect movement of said pistons in said cylinders to selectively vary the pressure medium in all of the said pockets simultaneously.

4. A friction joint as claimed in claim 3 including a seal associated with each of said pistons for preventing leakage of pressure medium.

5. A friction joint as claimed in claim 3 including screw means engaging through said ring and threadedly engageable in one of said members for selectively displacing said ring axially thereby to effect axial displacement of said pistons secured to said annular ring.

6. A friction joint as claimed in claim 1 wherein at least one of the confronting surfaces of said members is treated in a manner to obtain an increased co-efficient of friction.

7. Means providing a friction joint between a pair of members having first and second annular confronting surfaces spaced apart to define an annular space comprising a flexible resilient sleeve member in the annular space between the confronting surfaces of said members, said sleeve member sealingly connected to one of said members in a predetermined pattern defining a plurality of independent non-secured sleeve portions, each said non-secured sleeve portion and surface of said one member defining a pocket, said plurality of pockets being arranged in an annular pattern, means for independently pressurizing by a fluid pressure medium each of said pockets so that the non-secured sleeve portions deflect into pressure applying relation with the confronting surface of the other member which the sleeve confronts and means for selectively relieving independently the pressure in each pocket.

8. A friction joint as claimed in claim 7 wherein one of said members comprises a shaft and the other member comprises a collar surrounding said shaft and space therefrom.

9. A friction joint as claimed in claim 7 wherein said seal means comprises rubber elements vulcanized to the periphery of the walls of each of said pockets and wherein each of said rigid elements frictionally engages said seal means to thereby retain them in place and provide a self-contained unit.

* * * * *